Patented May 23, 1939

2,159,376

UNITED STATES PATENT OFFICE 2,159,376

MAKING OF LOW VISCOSITY CELLULOSE ETHERS

Richard D. Freeman and Martin J. Roberts, Midland, Mich., assignors to The Dow Chemical Company, Midland, Mich., a corporation of Michigan No Drawing. Application July 19, 1938, Serial No. 220,133

4 Claims. (Cl. 260—231)

This invention relates to a method for the production of stable, low viscosity cellulose ethers, and particularly to a method whereby a low viscosity cellulose may be prepared which is suitable for etherification to form such ethers.

Viscosity data herein are, in the case of cellulose, reported in two different forms. By the expression "1 per cent viscosity" is meant the viscosity of cellulose as measured on a 1 per cent solution by weight thereof in a cuprammonium hydroxide reagent containing 15 grams of copper and 200 grams ammonia per liter. The expression "3 per cent viscosity" refers to a viscosity measurement on a 3 per cent solution of the cellulose in a cuprammonium reagent containing 30 grams of copper and 200 grams of ammonia per liter. Viscosity measurements relating to cellulose ethers are reported herein based on determinations at 25° C. on 5 per cent solutions by weight of the cellulose ether in a solvent consisting of 80 parts of toluene and 20 parts of ethanol, by volume.

It has long been desired to obtain stable cellulose ethers having low intrinsic viscosity, and more especially such ethers which have viscosities lower than 20 centipoises. In the case of ethyl cellulose it has been desired to produce a material having a viscosity in the range from about 5 to about 10 centipoises. Cellulose ethers in this viscosity range are not common, and such ethers as have been prepared falling in the above-defined viscosity range have been unsatisfactory for many purposes owing to their instability toward heat and light or because of their brittleness which makes them inapplicable to a variety of possible commercial uses for such materials. Lower alkyl ethers of cellulose, among the most important of which is ethyl cellulose, have occasionally been prepared within the above-mentioned desired viscosity range by methods involving either aging of the alkali cellulose prior to etherification or reducing the viscosity of a cellulose ether by degradation of its molecule with acid, both processes producing ethyl cellulose in low yields. The process involving long time aging of alkali cellulose at elevated temperatures results invariably in the production of a large proportion of oxidation products in the alkali cellulose which cannot be etherified to produce a uniform, stable cellulose ether. The processes involving degradation of the cellulose ether molecule by means of acid hydrolysis have resulted invariably in a relatively unstable and brittle cellulose ether product.

It has long been known that cellulose in its various forms can be bleached by the action of chlorine. This has ordinarily been accomplished by suspending the cellulosic fibers to be treated in an aqueous medium and bubbling chlorine thereinto or adding to the suspension a reagent capable of liberating chlorine, such as a hypochlorite. Other methods of bleaching cellulose have involved the treatment of moist cellulose with dry chlorine gas, ordinarily carried out at room temperature and under such conditions that little, if any, viscosity change in the cellulose be thereby effected. It has been considered undesirable to reduce the viscosity of cellulose during the bleaching operation since such viscosity reduction may result in a shortening of the cellulose fibers to a point where strong textiles or useful paper sheets and the like cannot be produced therefrom.

It has been considered in the past that chlorine should not be used for treating cellulosic fibers which contain less than 10 per cent of their weight of moisture since it has been stated that prolonged contact between the chlorine and dry cellulose will tend to char the cellulose and reduce it to a pulverulent condition. For this reason, among others, chlorine has never been used as a reagent to affect the viscosity of cellulose in such a manner as to produce useful low viscosity aggregates which may be satisfactorily employed in producing low viscosity cellulose ethers.

It is an object of the present invention to provide a convenient process for producing low viscosity cellulose adapted to the direct production of low viscosity alkali cellulose and thence stable, low viscosity cellulose ethers without requiring aging of the alkali cellulose or subsequent acid degradation of the cellulose ether. Other objects and advantages of the invention will appear as the description proceeds.

We have now found that the foregoing objects may be attained by subjecting an air-dry cellulosic aggregate, i. e. one containing not more than 10 per cent of moisture based on the weight of cellulose present, to the action of anhydrous chlorine gas, converting the so-formed low viscosity cellulose to alkali cellulose and immediately etherifying the alkali cellulose.

According to one method of carrying out our invention, a sheet or other aggregate of the cellulose fibers, suitably one which has previously been bleached and hence contains no substantial amount of impurity, is placed in a closed vessel wherein it is saturated with gaseous chlorine. The action of gaseous chlorine under such circumstances is slower than that of anhydrous hydrogen chloride when employed in a like manner, as described in our concurrently filed copending application Serial Number 220,134. Hence, it is possible to produce a cellulose of any desired viscosity characteristics intermediate between the original viscosity of the cellulose and the lowest level to whch it has been found practical to reduce cellulose viscosity and still obtain satisfactory cellulose ethers, i. e. down to about a 1 per cent viscosity of 4 to 5 centipoises. We ordinarily reduce the 1 per cent viscosity of the original cellulose by at least one-half. When the cellulose has become saturated with chlorine, it is allowed to stand, preferably at room temperature, for a period of from ½ hour to 20 hours, depending in part upon the original viscosity of the cellulose, and in part upon the level to which it is desired to reduce said viscosity.

After the chlorine treatment has reduced the viscosity to the desired level, the cellulose is removed from the chamber wherein it has been treated, exposed to the air for a short time to permit volatilization of excess chlorine, and etherified after having first been converted to alkali cellulose. As an alternative procedure, the low viscosity cellulose may be removed from the treating chamber, washed with large volumes of water, centrifuged or otherwise treated to remove excess water, and stored until needed in etherification or other reaction to produce cellulose derivatives.

The above-described treatment, contrary to the teachings of the prior art, does not result in charring the air-dry cellulose, nor does it shorten the cellulose fibers to such an extent that they are not useful in the preparation of strong cellulose derivatives. We have frequently practiced our invention by subjecting a sheet of cellulose fibers to the herein-described chlorine treatment and have found after the treatment that this sheet is still capable of supporting its own weight and that the fibers therein have not lost any appreciable amount of their original strength.

It is desirable, in carrying out the viscosity reduction according to the present method, to do so at moderate temperatures. Room temperature is ordinarily preferred, although a brief treatment with anhydrous chlorine at more elevated temperatures, i. e. up to 70° to 80° C., can be used to accomplish similar results. The chamber wherein the viscosity reduction is accomplished should preferably be swept clear of air and oxygen before sealing the cellulose in the chlorine atmosphere. The treatment with which we are concerned may be distinguished from bleaching operations as ordinarily performed both in the duration of the treatment and in the fact that the cellulose which we employ contains not more than 10 per cent of residual moisture.

The following examples illustrate the practice of our invention:

Example 1

1.66 pounds of air-dry bleached wood pulp containing 3.4 per cent residual moisture, based on the weight of cellulose, was shredded and placed in a five-gallon bottle. The air in the bottle was swept out by means of gaseous chlorine which was introduced through a tube leading to the bottom of the bottle. When the bottle was full of chlorine, it was sealed and the chlorine allowed to remain in contact with the cellulose for 4 hours at room temperature. The cellulose was thereafter thoroughly washed with distilled water and centrifuged. The 1 per cent viscosity of the original pulp was 28 centipoises while that of the chlorine-treated cellulose was 9.3 centipoises. This low viscosity cellulose was immediately converted to alkali cellulose which in turn was immediately etherified. The so-formed cellulose ether, when cast into films, was flexible, stable, and had greater strength and was capable of greater elongation than are most cellulose ethers of similar low viscosity produced by the hereinbefore-described processes which comprise the steps of aging an alkali cellulose to reduce its viscosity or of degrading a high viscosity cellulose ether by means of acid treatment.

Example 2

A batch of the same cellulose as was employed in the preceding example was subjected to the same chlorine treatment, with the exception that the bottle and contents were heated to 50° C. in a water bath and the cellulose allowed to remain in contact with the chlorine for 1 hour. The 1 per cent viscosity of this cellulose immediately after having been removed from the bottle was 6.1 centipoises. It was employed in a manner similar to that described in the preceding example for the preparation of stable low viscosity ethyl cellulose.

Example 3

Approximately 20 pounds of air-dry cellulose pulp in thin sheet form was formed into 1½ to 2 pound rolls which were arranged loosely in a closed vessel. Chlorine gas was introduced into the vessel in a manner similar to that employed in the preceding examples. The cellulose and chlorine were allowed to remain in contact with one another for 4 hours at a temperature in the range from 25° to 28° C., after which the pulp was removed from the vessel, exposed to air for a short period to permit volatilization of excess chlorine, converted to alkali cellulose and etherified. The original viscosity of the cellulose prior to treatment was 28 centipoises, while that of the treated cellulose, on being removed from the chlorine chamber, was 7.4 centipoises. The cellulose was immediately disintegrated in a Baker Perkins shredder, and, while shredding was continued, was mixed with sufficient 50 per cent caustic soda solution and flake caustic soda to yield an alkali cellulose having an alkali : cellulose ratio of 2.2:1 and a water : cellulose ratio of 0.6:1. The alkali cellulose was removed from the shredder after 20 minutes mixing and immediately etherified in a closed reaction vessel. The etherifying agent employed was ethyl chloride, which was used in large excess over the amount theoretically necessary to react with the alkali present. The 3 per cent viscosity of the cellulose in the alkali cellulose just prior to etherification was 10 centipoises. When etherification was complete, the crude ethyl cellulose-containing reaction mixture was discharged from the pressure vessel into a body of ethyl alcohol maintained at a temperature above the boiling points of the ethyl chloride used and the ethyl ether formed as a by-product during the reaction. The said ethyl ether and any remaining ethyl chloride were thus flashed from the reaction mixture while the ethyl cellulose was dissolved in the alcohol. The ethyl cellulose was found to have a viscosity of 12.6 centipoises, an ethoxyl content of 48.7 per cent, and to be soluble in all of the usual solvents for cellulose ethers. When a sample of the ethyl cellulose was heated to 170° C. in the presence of air for 50 minutes, it was found to retain 80 per cent of its original viscosity. This test is employed as evidence of the stability of the cellulose ether, and for such low viscosity ethers an 80 per cent stability under the conditions employed is highly satisfactory and is considerably better than the stability of cellulose ethers reduced to a similar viscosity level by either of the previously mentioned methods known to the prior art.

Other modes of applying the principle of our invention may be employed instead of the one explained, change being made as regards the process herein disclosed, provided the step or steps stated by any of the following claims or the equivalent of such stated step or steps be employed.

We therefore particularly point out and distinctly claim as our invention.

1. The process which comprises subjecting an air-dry cellulose containing less than 10 per cent residual moisture to the action of substantially anhydrous chlorine gas in quantity sufficient to saturate the said residual moisture in the cellulose, aging the so-treated cellulose in the presence of chlorine gas whereby the intrinsic viscosity of the cellulose is substantially reduced, converting the so-formed low viscosity cellulose to alkali cellulose, and immediately etherifying the alkali cellulose, whereby there is formed a stable, low viscosity cellulose ether.

2. The process which comprises subjecting an air-dry cellulose containing less than 10 per cent residual moisture to the action of substantially anhydrous chlorine gas in quantity sufficient to saturate the said residual moisture in the cellulose, aging the so-treated cellulose in the presence of chlorine gas whereby the 1 per cent viscosity of the cellulose is reduced by at least one-half, converting the so-formed low viscosity cellulose to alkali cellulose, and immediately etherifying the alkali cellulose, whereby there is formed a stable, low viscosity cellulose ether.

3. The process which comprises the steps of saturating the residual moisture in an aggregate of air-dry cellulose with anhydrous chlorine gas, heating the so-impregnated cellulose in an atmosphere of chlorine in a closed vessel until the 1 per cent viscosity of the cellulose is below about 10 centipoises, converting the so-formed low viscosity cellulose to alkali cellulose, and immediately etherifying the alkali cellulose, whereby there is formed a stable, low viscosity cellulose ether.

4. The process which comprises the steps of saturating the residual moisture in an aggregate of air-dry cellulose with anhydrous chlorine gas, heating the so-impregnated cellulose to a temperature in the range from room temperature to about 80° C. in an atmosphere of chlorine in a closed vessel until the viscosity of the cellulose is below about 10 centipoises when determined on a 1 per cent solution of the cellulose in a cuprammonium reagent containing 15 grams of copper and 200 grams of ammonia per liter, converting the so-formed low viscosity cellulose to alkali cellulose, and immediately etherifying the alkali cellulose, whereby there is formed a stable, low viscosity cellulose ether.

RICHARD D. FREEMAN.
MARTIN J. ROBERTS.